(12) United States Patent
Bauer et al.

(10) Patent No.: US 6,527,329 B2
(45) Date of Patent: Mar. 4, 2003

(54) SUN VISOR FOR VEHICLES

(75) Inventors: Thomas Bauer, Sulzfeld (DE); Dirk Soldinger, Pfinztal (DE); Thorsten Rauschenberger, Kraichtal-Lanzhausen (DE)

(73) Assignee: Utescheny AG, Zaisenhausen (DE)

( * ) Notice: Subject to any disclaimer, the term of this patent is extended or adjusted under 35 U.S.C. 154(b) by 0 days.

(21) Appl. No.: 10/135,937

(22) Filed: Apr. 29, 2002

(65) Prior Publication Data

US 2002/0121796 A1 Sep. 5, 2002

Related U.S. Application Data

(62) Division of application No. 09/731,478, filed on Dec. 6, 2000, now Pat. No. 6,406,086.

(30) Foreign Application Priority Data

Dec. 8, 1999 (DE) ................................. 299 21 566 U
Mar. 11, 2000 (DE) ................................. 200 04 581 U

(51) Int. Cl.[7] ................................................ B60J 3/00
(52) U.S. Cl. .................... 296/97.4; 296/97.8; 296/97.5; 296/97.6
(58) Field of Search ............................. 296/97.4, 97.8, 296/97.5, 97.11, 97.1, 97.6, 97.9

(56) References Cited

U.S. PATENT DOCUMENTS

| 1,468,750 | A | | 9/1923 | Sechrist | 296/97.4 |
|---|---|---|---|---|---|
| 1,590,203 | A | | 6/1926 | Olssen et al. | 296/97.4 |
| 1,772,233 | A | | 8/1930 | Vivier | 296/97.4 |
| 2,101,901 | A | * | 12/1937 | Fletcher | 296/97.4 |
| 2,549,395 | A | | 4/1951 | Short | 296/97.5 |
| 2,595,873 | A | | 5/1952 | Solmes | 296/97.4 |
| 2,596,873 | A | * | 5/1952 | Solmes | 296/97.8 |
| 2,678,183 | A | | 5/1954 | Bell | 296/97 |
| 3,016,262 | A | | 1/1962 | Hunt | 296/97 |
| 3,329,461 | A | | 7/1967 | Edger | 296/97 |
| 3,834,755 | A | * | 9/1974 | Dexter | 296/97.11 |
| 4,195,876 | A | | 4/1980 | Tiperio | 296/97 |
| 4,486,075 | A | * | 12/1984 | Cohen | 359/840 |
| 4,521,047 | A | * | 6/1985 | Saxman | 296/97.1 |
| 4,614,412 | A | | 9/1986 | Cohen | 350/632 |
| 4,623,188 | A | * | 11/1986 | Juraschek et al. | 296/97.5 |
| 4,624,499 | A | * | 11/1986 | Flowerday | 296/97.5 |
| 4,792,176 | A | | 12/1988 | Karford | 296/97 |
| 4,836,599 | A | * | 6/1989 | Svensson | 296/97.5 |
| 4,971,383 | A | * | 11/1990 | Tawaraya | 296/97.1 |
| 5,104,174 | A | * | 4/1992 | Gute | 296/97.4 |
| 5,283,683 | A | * | 2/1994 | Yamamoto | 296/97.8 |
| 5,301,994 | A | * | 4/1994 | Wilson | 296/97.2 |
| 5,306,065 | A | | 4/1994 | Ades | 296/97.6 |

(List continued on next page.)

FOREIGN PATENT DOCUMENTS

| DE | 3422624 | * | 12/1985 | |
|---|---|---|---|---|
| DE | 3833625 | * | 4/1990 | |
| DE | 9412656 U1 | | 12/1994 | |
| DE | 29905597 U1 | | 7/1999 | ............. B60J/3/02 |
| EP | 0291435 | * | 3/1988 | |
| EP | 0400552 | * | 8/1989 | |
| JP | 2 144220 | * | 6/1990 | |
| WO | WO93/09969 | * | 5/1993 | |
| WO | WO94/08812 | * | 4/1994 | |

*Primary Examiner*—Kiran Patel
(74) *Attorney, Agent, or Firm*—Darby & Darby

(57) ABSTRACT

A sun visor for a vehicle arranged between a driver's and a front passenger's sun visor. The sun visor has a holding unit and a unit arranged on the holding unit with a visor body. The visor body is planar and moves from a retracted position to a functional position. The visor body has at least one moveable surface unit. The surface of the visor body increases, when the visor body is moved from a retracted position to a functional position, and decreases when the visor body Is moved from a functional position to a retracted position.

15 Claims, 5 Drawing Sheets

U.S. PATENT DOCUMENTS

| | | | |
|---|---|---|---|
| 5,333,927 A | * 8/1994 | PreJean | 296/97.7 |
| 5,431,473 A | * 7/1995 | Hiemstra | 296/97.2 |
| 5,445,427 A | * 8/1995 | Vandagriff | 296/97.6 |
| 5,472,255 A | * 12/1995 | Moore | 296/97.6 |
| 5,490,708 A | * 2/1996 | Lee | 296/97.8 |
| 5,580,117 A | 12/1996 | Goclowski | 296/976.6 |
| 5,873,621 A | * 2/1999 | Kuighadush et al. | 296/97.8 |
| 5,913,560 A | * 6/1999 | Perin | 296/97.6 |
| 6,039,381 A | 3/2000 | Klauer | 296/97.6 |
| 6,106,048 A | 3/2000 | Wright | 296/97.13 |
| 6,059,347 A | * 5/2000 | Davalos | 296/97.5 |
| 6,131,987 A | * 10/2000 | Rossiter | 296/97.2 |
| 6,189,947 B1 | * 2/2001 | Annan | 296/97.8 |
| 6,406,086 B2 | * 6/2002 | Bauer et al. | 296/97.4 |

* cited by examiner

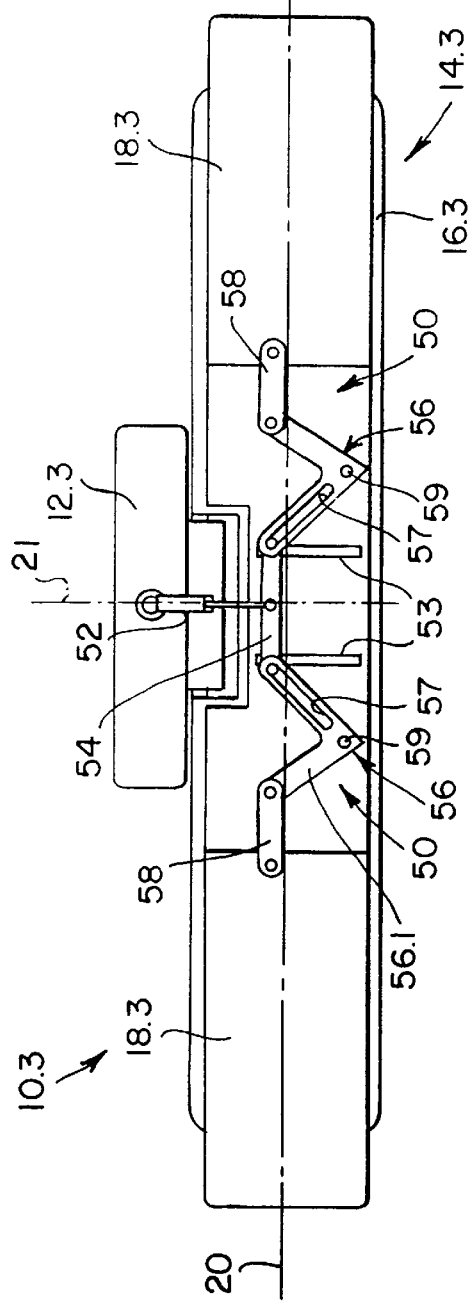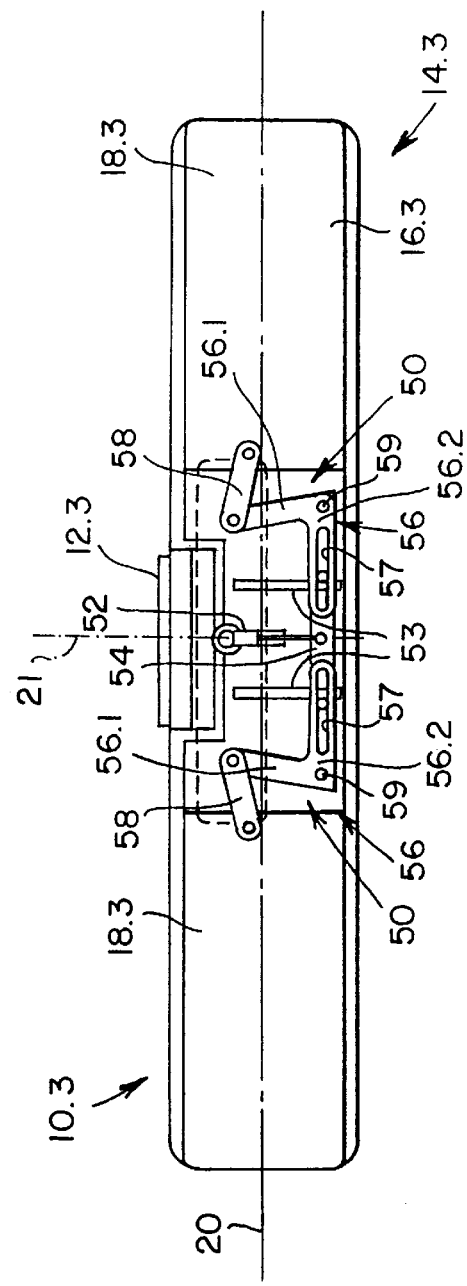

SUN VISOR FOR VEHICLES

CROSS-REFERENCE TO RELATED APPLICATIONS

This application is a division of U.S. patent application Ser. No. 09/731,478, filed on Dec. 6, 2000 now U.S. Pat. No. 6,406,086, entitled "Sun Visor for Vehicles," the disclosure of which is incorporated herein by reference in its entirety.

TECHNICAL FIELD

The present invention relates to a sun visor for a vehicle, having a holding unit which can be fastened to the interior, and an antidazzle unit which, is arranged on the holding unit, has a visor body of essentially planar design, and can be moved, for antidazzle purposes, from a retracted position into a functional position, the sun visor being arranged in particular between a driver's sun visor and front-passenger's sun visor.

Sun visors of this type are fitted in highs piece numbers into car interiors. They are intended, on the one hand, to be producible economically and, on the other hand, to ensure permanent and reliable functioning and simple installation.

The sun visor under consideration is usually positioned above the interior mirror of a vehicle between the driver's sun visor and front-passenger's sun visor and is intended to act there as an antidazzle means as soon as any dazzling effects act in this region on the driver. In this case, the sun visor is preferably actuated manually by the driver.

PRIOR ART

Known sun visors consist of two half shells which are either ultrasonically sealed or clipped to each other during production of the sun visor. This entails an increased outlay on production, since two components have to be processed. Moreover, an outer decorative groove or a welding bead is visible, which in many cases is not desirable for visual reasons. This sun visor has a defined outer contour adapted to the spatial conditions in the region between the driver's sun visor and front-passenger's sun visor. In a further known embodiment of a sun visor, the surface contour consists of a foamed PP or PU plastic body into which a so-called plastic insert has been inserted for stability reasons and which also forms the rotating spindle to which the holding device is connected. The foamed plastic together with a plastic insert is sealed as a whole by film. In addition to a complicated production process, a sun visor of this type has strength properties which are not in the optimum range.

German utility model G 94 12 656 discloses a sun visor of the type mentioned at the beginning, which is distinguished in that the visor body is designed in one piece as a profiled unit which is essentially closed and is present at least in some areas. This does indeed offer manufacturing advantages, the outer circumference contour of the sun visor being fixedly defined.

German utility model 299 05 597 discloses a sun visor which is distinguished in that a damping unit acts on the movement of the visor body from the retracted position to the functional position and vice versa.

All of the sun visors which are already known and are arranged in the region between the driver's sun visor and front-passenger's sun visor have a clearly defined outer circumferential contour adapted to the structural conditions of the vehicle interior in this region.

SUMMARY OF THE INVENTION

The present invention is based on the object or the technical problem of specifying a sun visor of the type mentioned at the beginning, which has an improved antidazzle action and at the same time can be produced economically, fitted economically and ensures permanent and reliable functioning.

The sun visor according to the invention is provided by the features of independent claim 1. Advantageous refinements and developments are the subject matter of the dependent claims.

Accordingly, the sun visor according to the invention is distinguished in that the visor body has at least one moveable surface unit which increases the surface of the visor body, when the visor body is moved from the retracted position to the functional position, and conversely reduces the surface of the visor body when it is moved from the functional position into the retracted position.

The sun visor according to the invention makes it possible for the region, which normally cannot be covered between the driver's sun visor and front-passenger's sun visor in the unfolded state of the interior sun visor, since the interior sun visor may not exceed a certain width in the retracted position owing to structural constraints, to be reliably covered in spite of this, thereby reliably increasing the antidazzle protection.

A particularly preferred refinement which can be implemented in a structurally simple manner is distinguished, in a first design variant, in that the surface unit is designed to be mounted on the visor body in a manner enabling it to be displaced along an axis.

A particularly preferred refinement which can be implemented in a structurally simple manner is distinguished, in a second design variant, in that the surface unit is mounted on the visor body in a manner enabling it to be rotated about an axis of rotation.

An alternative refinement preferably implementing the structural boundary conditions is distinguished in that there are two surface units which are arranged at the lateral end edge regions of the visor body.

As regards the movement of the visor body, a folding movement about an axis of rotation is conceivable, on the one hand, and displacement essentially vertically out of the holding unit is possible.

In order to increase the ease of operation, a preferred refinement is distinguished in that the movement of the visor body and of the surface units is triggered by actuating an actuating member, which is preferably designed as an actuating knob.

One design variant has been developed as a means of protecting the material, said design variant being distinguished in that a damping unit acts on the movement of the visor body.

A design variant which can be implemented in a structurally particularly simple manner and ensures permanent and reliable functioning is distinguished in that an articulated-rod mechanism is arranged between the holding unit and surface unit, said mechanism effecting the movement of the surface unit when the visor body is moved, a particularly advantageous development being distinguished in that the articulated-rod mechanism has an articulated rod which is respectively connected in an articulated manner, via a ball-and-socket joint, to the holding unit and to a projecting unit integrally formed on the surface unit, the projecting unit being guided in a longitudinally displaceable manner in a recess on the visor body.

A further design variant according to the invention which can be implemented in a structurally simple manner and at the same time ensures long-lasting functionality is distinguished in that the axis of rotation of the surface unit is arranged within the visor body and essentially perpendicularly with respect to the outer surface thereof and in a manner enabling it to be swung through a recess on the side end side of the visor body, a spring unit acting on the surface unit and moving the surface unit into the functional position, and the holding unit closing the recess in the retracted position of the visor body, releasing it in the functional position and, when the visor body is retracted counter to the action of the spring unit, rotating the surface unit into the interior of the visor body.

A particularly advantageous third design variant of the sun visor according to the invention is distinguished in that the articulated-rod mechanism has a connecting rod which is mounted on the holding unit and during folding of the visor body acts in a pushing or pulling manner on a sliding unit, an articulated bar is coupled to the surface unit, an L-shaped articulated lever is arranged between the articulated bar and the sliding unit and is mounted in the region of the intersecting point of its legs in a manner enabling it to rotate about an axis of rotation, the articulated bar is coupled in an articulated manner in the free end region of the one leg of the articulated lever, the sliding unit is mounted rotatably in a linear guide of the other leg.

In order to obtain a compact construction, all of the units of the articulated mechanism are present within the visor body, all of the components of movement of the individual parts when unfolding the visor body in order to extend or retract the surface units also taking place within the visor body.

A structurally particularly simple and economical solution is distinguished in that the linear guide is designed as a slotted recess in the one leg of the L-shaped articulated lever.

A particularly preferred refinement of the sun visor according to the invention, which ensures particularly good ease of operation, is distinguished in that the sun visor is designed as a central sun visor next to a driver's sun visor, there are position-recognition means for recognizing the position of the driver's sun visor, which is rotatable about an axis of rotation, there are ambient-light-recognition means, there is a control unit which evaluates the signals from the position-recognition means and the ambient-light-recognition means and which activates the motor assembly for moving (H; K) the sun visor from the retracted position into the functional position and vice versa.

In a particularly preferred manner, the control unit automatically enables the movement of the central sun visor as soon as the driver's sun visor is moved manually by the driver. This may also take place with a certain time delay.

The position-recognition means are preferably designed as magnetic Hall.sensors.

Further embodiments and advantages of the invention are produced by the features furthermore mentioned in the claims and by the exemplary embodiments given below. The features of the claims may be combined with one another in any desired manner insofar as they are obviously not mutually exclusive.

BRIEF DESCRIPTION OF THE DRAWING

The invention and advantageous embodiments and developments thereof are described and explained in greater detail below with reference to the examples illustrated in the drawing. According to the invention, the features to be gathered from the description and the drawing can be used individually by themselves or a number of them can be used in any desired combination. In the drawing:

FIG. 4 shows a schematic ghosted illustration of a third exemplary embodiment of a sun visor in the unfolded state, i.e. with the surface units extended laterally, FIG. 5 shows a schematic ghosted illustration of the device according to FIG. 4 in the folded-in state.

WAYS OF IMPLEMENTING THE INVENTION

Figure 1:
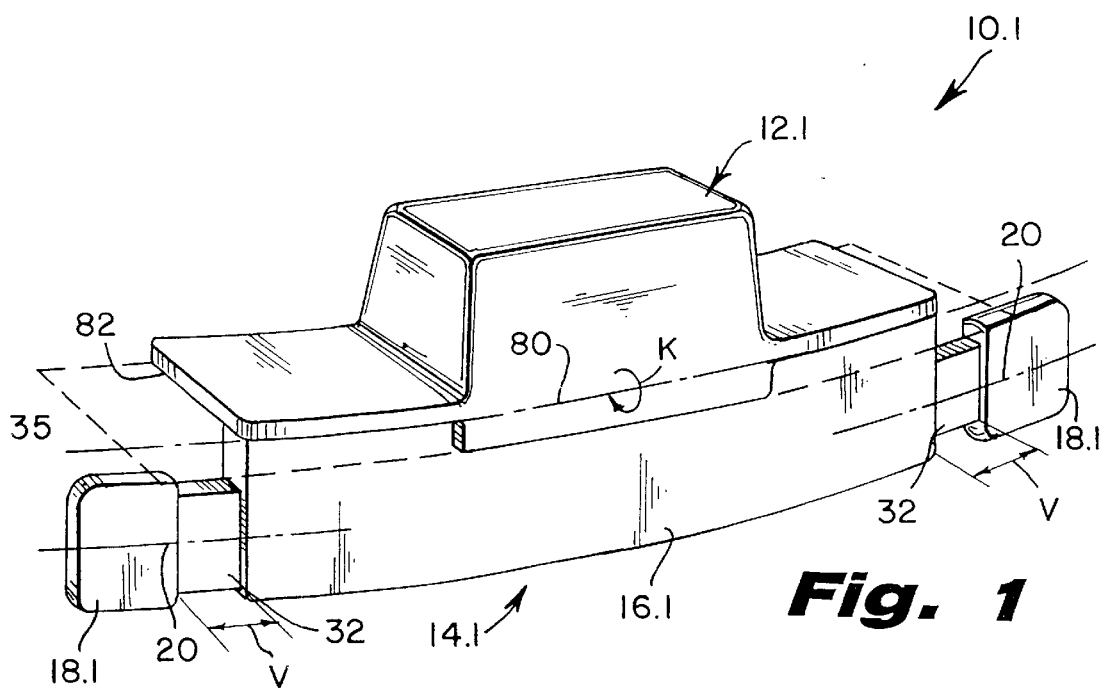
FIG. 1 shows a schematic perspective illustration of a first design variant of a sun visor having laterally extendible surface units, in a front view.

In a first exemplary embodiment of a sun visor 10.1 according to FIG. 1, there is a holding unit 12.1 (illustrated schematically) which can be fastened in the interior of a vehicle and to which an antidazzle unit 14.1 having a visor body 16.1 of essentially planar design is connected via an axis of rotation 80 (illustrated schematically). The position illustrated in FIG. 1 of the antidazzle unit 14.1 constitutes the so-called functional position, i.e. the antidazzle unit 14.1 is unfolded and serves for antidazzle purposes. If the antidazzle unit 14.1 is no longer required, it is folded inward in the arrow direction K about the axis of rotation 80 and in this so-called inoperative position bears flat against the inner wall of the holding part 12.1. The folding movement K can either be carried out manually or displacing means or rotating means are provided which, when actuated, enable the antidazzle unit 14.1 to be folded in or unfolded. Means of this type are not illustrated in FIGS. 1 to 5.

The sun visor 10.1 is distinguished in that the lateral end edges each have a surface unit 18.1 which engages, via a projecting unit 32, into a recess 35 of the visor body 16.1 and is mounted in a longitudinally displaceable manner in the visor body 16.1, i.e. in a manner such that it can be displaced essentially perpendicularly with respect to the lateral end edge in the direction of an axis 20. The maximum displacement path is illustrated in FIG. 1 by the double arrow V.

The surface units 18.1 are, as described, mounted in a longitudinally displaceable manner in the visor body 16.1 and at the same time are connected to the components surrounding them—here the holding unit 12.1—in such a manner that when the folding movement K is executed, the surface units 18.1 are displaced.

Figure 2:
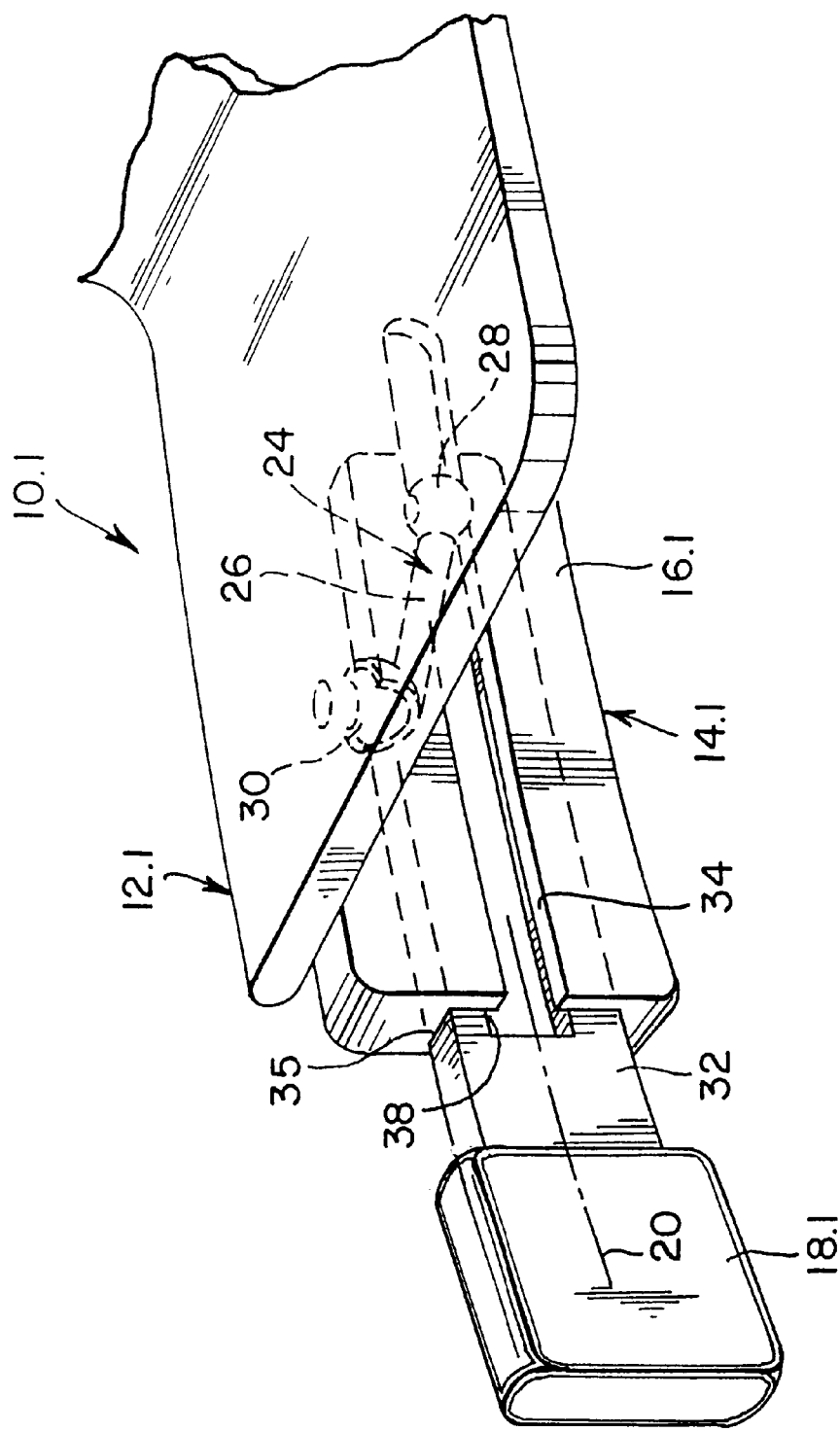
FIG. 2 shows a schematic detail perspective of the sun visor according to FIG. 1 with the articulated mechanism illustrated, as seen in a view from the rear.

In the exemplary embodiment according to FIG. 1, use is made for this purpose of an articulated-rod mechanism 24, which is illustrated schematically in FIG. 2. It consists of an articulated rod 26 having, at one end, a ball-and-socket joint 28, which is coupled to the projecting unit 32 of the surface unit 18.1, and, at the other end, a ball-and-socket joint 30, which is coupled to the holding unit 12.1. On its rear side, the visor body 16.1 has a slot 34 which is parallel to the longitudinal axis 20, is open toward the end side and adjoins the recess 35. The projecting unit 32 likewise has a slot 38 running parallel to the longitudinal axis 20. In the end region of the projecting unit 32, the ball-and-socket joint 28 is guided behind the slot 34 and is connected in the slot 38 in an articulated manner to the projecting unit 32. As a whole, the articulated mechanism 24 constitutes a kinematic constricted guide for displacement of the surface unit 18.1.

In the folded-in state of the visor body 16.1, the surface unit 18.1 is in a state where the projecting unit 32 of the surface unit 18.1 is completely retracted into the recess 35 of the visor body 16.1. If the visor body 16.1 is now folded into the functional position (FIG. 1), the articulated mechanism 24 causes the projecting unit 32 and therefore the surface unit 18.1 to be pushed out of the interior of the visor body 16.1 by the extent V in the direction of the axis 20. This increases the size of the antidazzle surface, with the result that particularly in the case of a sun visor arranged as a central sun visor between the driver's sun visor and the front-passenger's sun visor, any remaining surfaces between the central visor and driver's sun visor or front-passenger's sun visor are reliably covered.

Figure 3:
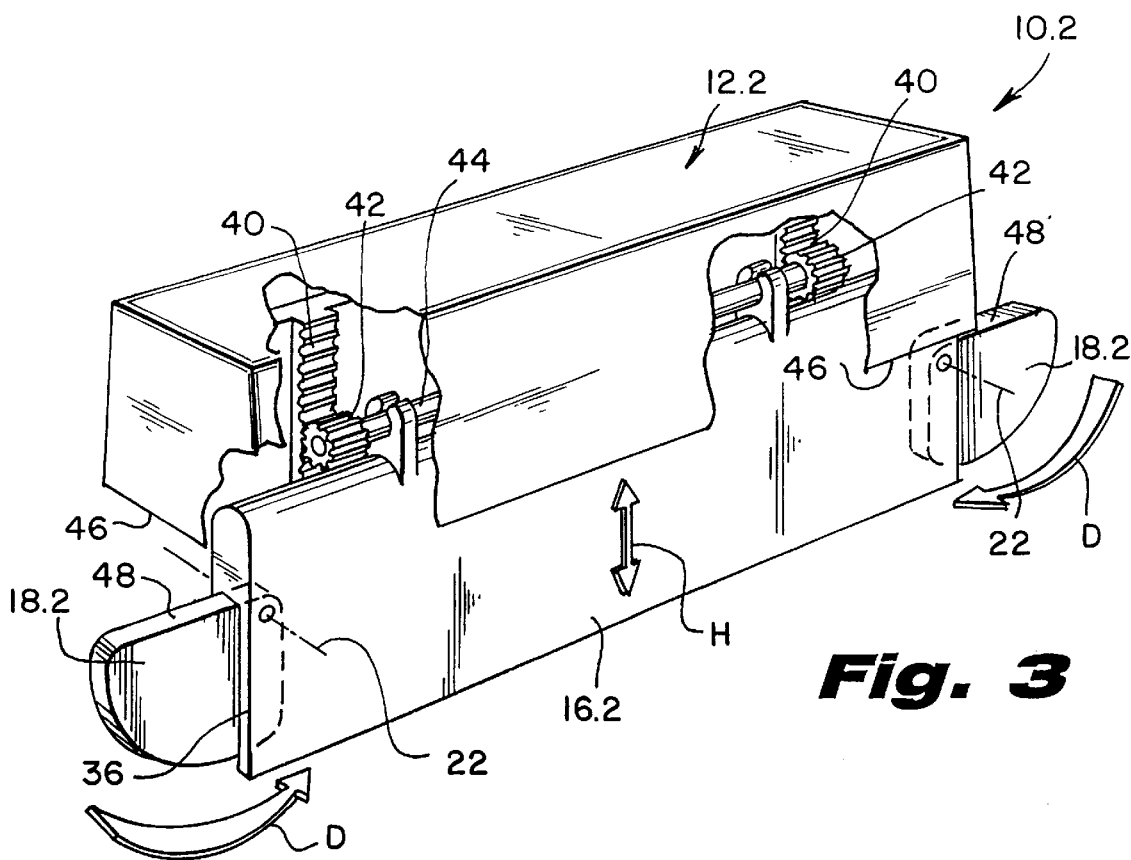
FIG. 3 shows a schematic perspective illustration of a second exemplary embodiment of a sun visor with surface units which can be folded laterally.

In the second design variant, illustrated in FIG. 3, of a sun visor 10.2, there is likewise a housing-like holding unit 12.2 on which an antidazzle unit 14.2 having a visor body 16.2 is mounted in such a manner that it can be pulled out of the holding unit 12.2 or pushed into it essentially in the vertical direction with respect to it (double arrow H). For guiding purposes, there are arranged in the interior of the holding unit 12.2 two spaced-apart racks 40 into which engage corresponding toothed wheels 42 which are mounted on the visor body 16.2 in a manner enabling them to be rotated via a rotating spindle 44. If the rotating spindle is driven in a rotating manner via means (not illustrated in greater detail in FIG. 3), the visor body 16.2 is displaced downward or upward, depending on the direction of rotation of the rotating spindle 44.

On each of its lateral end regions, the visor body 16.2 has a recess 36 in which there are surface units 18.2 which are mounted in a manner enabling them to be rotated about an axis of rotation 22 arranged essentially perpendicularly with respect to the plane of the visor body, the surface units 18.2, on reaching the extended position function according to FIG. 3, being pivoted outward about the axis of rotation 22 and being pressed into the interior of the visor body 16.2 when the visor body 16.2 is retracted (arrow D). The surface units 18.2 are of essentially ear-shaped design having, in the unfolded state, a downwardly tapering cross section, the axis of rotation 22 being arranged in the direct, upper edge region of the end edge of the visor body 16.2. In this case, the outer contour of the surface units 18.2 is designed in such a manner that, on the one hand, they can be pivoted back into the recess 36 of the visor body 16.2 without a problem, said surface units, in the pivoted-in state, being virtually flush with the end side, and, on the other hand, are designed in such a manner that they cover a relatively large surface, in the pivoted-out state, for antidazzle purposes.

The surface units 18.2 are subject to the action of elastic means, for example spring elements (not illustrated in greater detail in FIG. 3) which attempt to press the surface units 18.2 outward in a rotating manner. This is the case in the extended state of the visor body 16.2. In this state, the spring elements can cause the rotational movement. If the visor body 16.1 is retracted, in the region of the surface units 18.2 the lower edge 46 of the holding unit 12.2 presses onto the upper edge 48 of the surface units 18.2, with the result that during the retracting process the latter are rotated about the axis of rotation 22 and counter to the action of the spring elements into the interior of the visor body 16.2. The holding unit 12.2 is designed here in such a manner that it is able to receive the entire visor body 16.2 in terms of its height.

Damping elements (not illustrated in the figures) resulting in a damped movement of the visor body can act both on the folding movement K of the design variant according to FIGS. 1 and 2 and on the displacing movement H of the second design variant according to FIG. 3.

A third exemplary embodiment of a sun visor 10.3 according to the invention is illustrated schematically in FIGS. 4 and 5. The procedure in this construction is also such that the surface units 18.3 extend laterally out of the end edges along a longitudinal axis 20 during the unfolding of the visor body 16.3 of the antidazzle unit 14.3.

However, the articulated mechanism 50, which effects the extending and retracting movement of the surface units 18.3, is of a different type of construction. First of all, a connecting rod 52 is coupled to the holding unit 12.3. This connecting rod 52 is of telescopic design. The connecting rod 52 is coupled in its other end region to a sliding unit 54 designed as a sliding beam, this sliding unit 54 being mounted such that it can be displaced with respect to the axis 20, during the folding process, within guides 53 present on the visor body 16.

An articulated bar 58 is coupled in an articulated manner to each surface unit 18.3, in its inwardly pointing end region. An L-shaped articulated lever is connected between the articulated bar 58 and the sliding unit 54. This articulated lever is mounted in a manner enabling it to be rotated about an axis of rotation 59 in the corner region, i.e. in the region in which its two legs 56.1 and 56.2 coincide. The one leg 56.1 is connected in an articulated manner to the articulated bar 58. The other leg 56.2 has, in its longitudinal direction, a slotted recess 57 in which an articulated connection to the sliding unit 54 engages. In the unfolded state, i.e. when surface units 18.3 are extended (FIG. 4), the L-shaped articulated lever 56 is arranged in the form of a V. The relative rotations of the individual parts with respect to one another (articulated bar 58, L-articulated lever 56 and sliding unit 54) take place about points of articulation whose axis of rotation is arranged essentially perpendicularly with respect to the visor body 16.3. All in all, the sun visor 10.3 according to FIGS. 4 and 5 has a symmetrical construction with respect to its central axis 21, which is arranged perpendicularly with respect to the axis 20.

Figure 6:
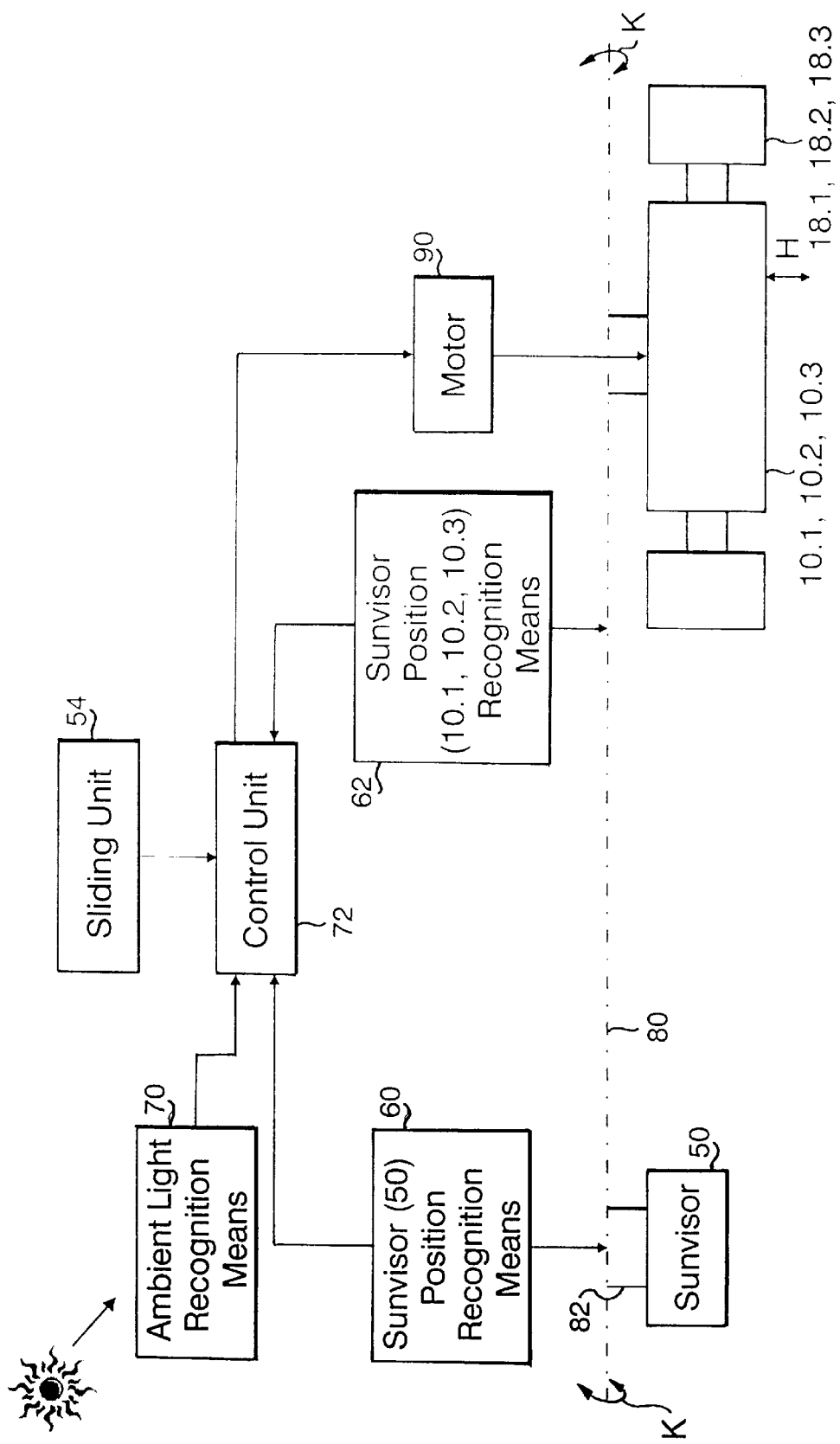
FIG. 6 shows a schematic block diagram illustration of a central sun visor coupled to the movement of a driver's sun visor.
Figure 7:
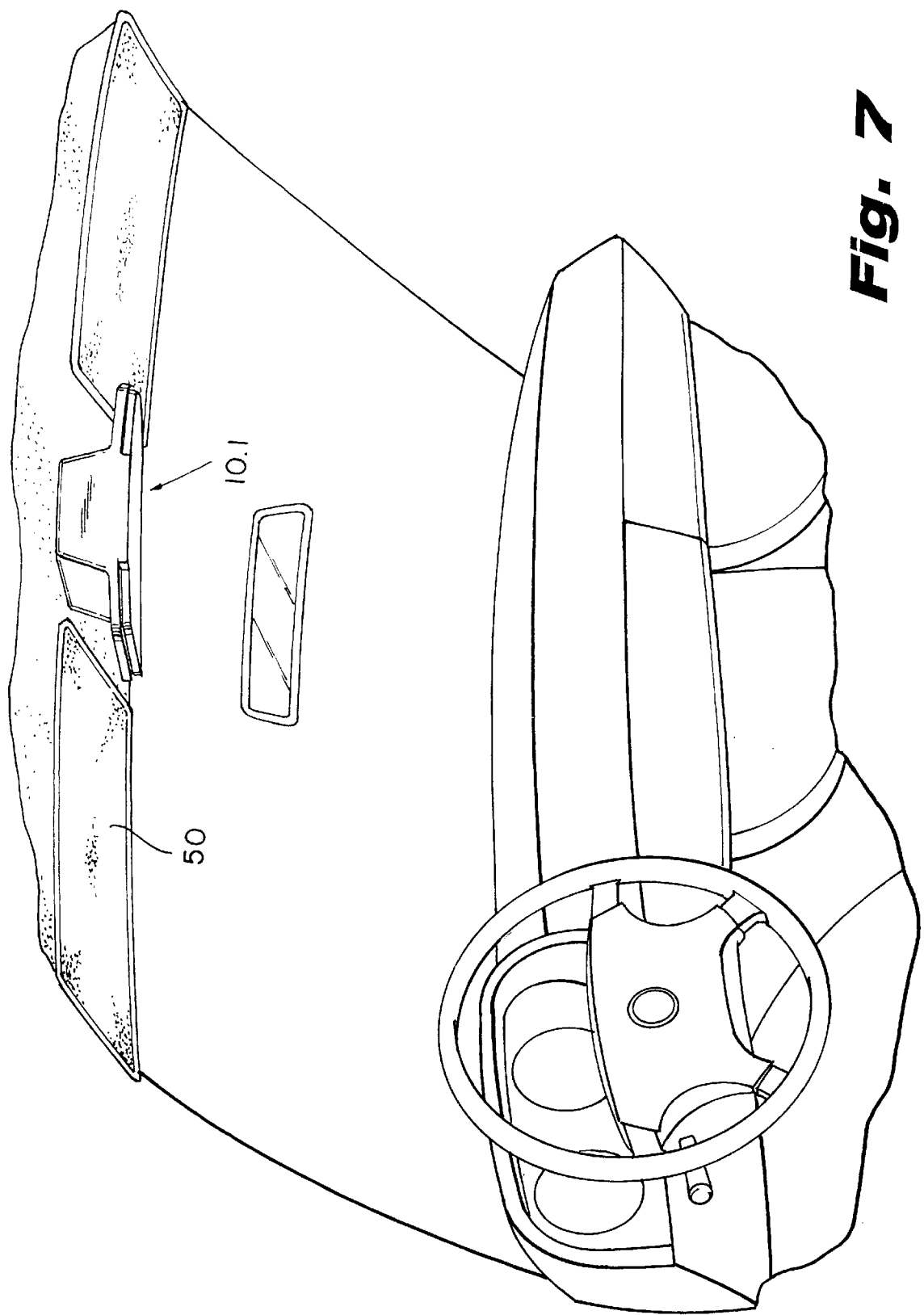
FIG. 7 shows the sun visor of FIG. 1 arranged between the driver sun visor and the front passenger sun visor in accordance with a first embodiment of the present invention.

FIG. 6 schematically illustrates a structural design variant which has particularly good ease of operation. The sun visor 10.1, 10.2, 10.3 is designed as a so-called central sun visor, i.e. it is situated between a driver's sun visor 50, which can be rotated about an axis of rotation 82 (arrow K1), and a front-passenger's sun visor (not illustrated in greater detail).

In this case, the sun visor 10.1, 10.2, 10.3 carries out a movement into the functional position or back into the retracted position whenever the driver pivots the driver's sun visor 50 into the functional position or retracted position. For this purpose, use is made of position-recognition means 60 which are preferably designed as magnetic Hall sensors and which detect the position of the driver's sun visor 50. There are furthermore means 70 for recognizing the strength of the ambient light. The means 70 and 60 pass their signals to a control unit 72 which evaluates them. The control unit 72 is likewise acted upon by further means 62 for recognizing the position of the sun visor 10.1, 10.2, 10.3. At the same time, the control unit 72 itself acts upon a motor assembly which, depending on the embodiment, enables rotation K or displacement H of the sun visor 10.1, 10.2, 10.3, in the exemplary embodiment illustrated the surface units 18.1, 18.2, 18.3 extending or retracting through the movement of the sun visor 10.1, 10.2, 10.3.

The operating procedure is as follows.

The magnetic Hall sensors 62 are used to detect the position of the driver's sun visor 50. If the driver's sun visor 50 is folded down and the light sensor 70 recognizes daylight, the sun visor 10.1, 10.2, 10.3 is pivoted into the functional position in the vehicle interior. The end position of the sun visor 10.1, 10.2, 10.3 is recognized via a magnetic Hall sensor 62. This end position may also be recognized by an increase in the electrical current for operating the motor assembly 90.

If the driver's sun visor 50 is folded upward or rotated against a side window, the sun visor 10.1, 10.2, 10.3 pivots back again into its retracted position which is likewise recognized via Hall sensors or via an increase in current. The pivoting back into the retracted position may take place with a time delay.

In principle, delay times can be taken into consideration and also changed at any time. A brief reduction in the daylight, for example during a short tunnel journey or when shadows are formed, does not result in the sun visor being folded upward, since this is not required in this case.

Finally, there is also an on/off switch 54 whose actuation either activates or deactivates the control device. When the off switch is actuated, the sun visor 10.1, 10.2, 10.3 in the extended state pivots back into the retracted position.

Overall, in order to implement this convenient solution use is made of an electronic module consisting of three submodules:

sensor arrangement comprising three Hall sensors and a sunlight sensor, control unit, controller, motor unit for activating the electric motor, coupling to the sun visor.

It is also conceivable, as an alternative to the light sensor 70 described, for use to be made of the light sensor which is already present in many vehicles, but this necessitates additional cabling to the CAN bus of the vehicle.

What is claimed is:

1. A sun visor for a vehicle, having a holding unit which can be fastened to the interior, and a unit which is arranged on the holding unit, has a visor body of essentially planar design, and can be moved from a retracted position into a functional position, the sun visor being arranged in particular between a driver's sun visor and front-passenger's sun visor, wherein the visor body has at least one moveable surface unit which increases the surface of the visor body, when the visor body is moved from the retracted position to the functional position, and conversely reduces the surface of the visor body, when it is moved from the functional position into the retracted position, wherein an articulated-rod mechanism is arranged between the holding unit and surface unit, said mechanism effecting the movement of the surface unit when the visor body is moved.

2. The sun visor as claimed in claim 1, wherein the articulated-rod mechanism (50) has a connecting rod (52) which is mounted on the holding (12.3) and during folding of the visor body (16.3) acts in a pushing or pulling manner on a sliding unit (54), an articulated bar (58) is coupled to the surface unit (18.13), an L-shaped articulated lever (56) is arranged between the articulated bar (58) and the sliding unit (54) and is mounted in the region of the intersecting point of its legs (56.1, 56.2) in a manner enabling it to rotate about an axis of rotation (59), the articulated bar (58) is coupled in an articulated manner in the free end region of the one leg (56.1) of the articulated lever (56), the sliding unit (54) is mounted rotatably in a linear guide of the other leg (56.2).

3. The sun visor as claimed in claim 2, wherein the sliding unit (54), the articulated lever (56) and the articulated bar (58) are arranged within the visor body (16.3).

4. The sun visor as,claimed in claim 2, wherein the linear guide is designed as a slotted recess (57).

5. The sun visor as claimed in claim 2, wherein the sliding unit (54) is designed as a sliding beam to whose two end regions an articulated lever (56) is coupled.

6. The sun visor as claimed in claim 2, wherein the connecting rod (52) is of telescopic design.

7. The sun visor as claimed in claim 1, wherein the sun visor (10.3) is designed as a central sun visor next to a driver's sun visor (50);

there are position-recognition means (60) for recognizing the position of the driver's sun visor, which is rotatable about an axis of rotation (82);

there are ambient-light-recognition means (70);

there is a control unit (72) which evaluates the signals from the position-recognition means (60) and the ambient-light-recognition means (70) and which activates the motor assembly (90) for moving (H; K) the sun visor (10.3) from the retracted position into the functional position and vice versa.

8. The sun visor as claimed in claim 7, wherein the control unit (72) enables, via the motor assembly (90), the sun visor (10.3) to move into the functional position as soon as the driver's sun visor (50) is folded into a functional position, and conversely the control unit (72) enables, via the motor assembly (90), the sun visor (10.3) to move into the retracted position as soon as the driver's sun visor is folded into the retracted position.

9. The sun visor as claimed in claim 7, wherein there are further position-recognition means (62) for recognizing the position of the sun visor (10.3).

10. The sun visor as claimed in claim 1, wherein the surface unit (18.3) is designed to be mounted on the visor body (16.3) in a manner enabling it to be displace along an axis (20).

11. The sun visor as claimed in claim 1, wherein there are two surface units (18.3) which are arranged on the lateral end edge regions of the visor body (16.3).

12. The sun visor as claimed in claim 1, wherein the visor body (16.3) can be moved, by being foldable (K) about an axis of rotation, from the retracted position into the functional position and vice versa.

13. The sun visor as claimed in claim 1, wherein there is a motor assembly (90) which implements the movements of the visor body (16.3) and/or of the surface:units (18.3).

14. The sun visor as claimed in claim 1, wherein a damping unit acts on the movement of the visor body.

15. The sun visor as claimed in claim 7, wherein the position-recognition means are designed as magnetic Hall sensors.

* * * * *